United States Patent [19]

Glinecke

[11] 4,343,364

[45] Aug. 10, 1982

[54] SPRINKLER HEAD CONSTRUCTION

[75] Inventor: Hermann R. Glinecke, Pennington, N.J.

[73] Assignee: Globe Fire Equipment Company, Standish, Mich.

[21] Appl. No.: 55,457

[22] Filed: Jul. 6, 1979

[51] Int. Cl.³ ............................................ A62C 37/08
[52] U.S. Cl. ...................................... 169/38; 169/42; 122/504.3
[58] Field of Search .................. 169/37, 38, 39, 41, 169/42, 57, 40; 236/101 E; 239/524, 518; 403/375; 220/96, 94 R, 95, 94 A; 294/16, 99 R; 49/1, 7; 126/287.5; 122/504.3; 98/86

[56] References Cited

U.S. PATENT DOCUMENTS

| 792,343 | 6/1905 | Newton | 169/38 |
|---|---|---|---|
| 1,345,217 | 6/1920 | Newton | 169/39 |
| 2,004,833 | 6/1935 | Rowley | 169/38 |
| 2,129,012 | 9/1938 | Lewis | 169/39 |
| 2,534,066 | 12/1950 | Rowley | 169/38 |
| 3,314,482 | 4/1967 | Young | 169/38 |
| 3,336,984 | 8/1967 | MacCartney | 169/38 |
| 3,341,047 | 9/1967 | Nauta | 220/96 |
| 3,874,456 | 4/1975 | Gloeckler | 169/39 |
| 3,923,191 | 12/1975 | Johnson | 220/94 R |
| 4,214,631 | 7/1980 | Hattori | 169/57 |

FOREIGN PATENT DOCUMENTS 593701 2/1978 U.S.S.R. ................................ 169/41

Primary Examiner—Robert J. Spar
Assistant Examiner—Kenneth Noland
Attorney, Agent, or Firm—Learman & McCulloch

[57] ABSTRACT

A fire extinguisher sprinkler head construction has a fitting adapted to be coupled to a water line and having a passage therein through which water may flow and impinge upon a deflector. The water passage normally is sealed by a closure and a collapsible strut, the latter including a eutectic member which liquifies upon reaching a predetermined temperature. The eutectic member is sandwiched between a pair of thermally insulating members, also forming part of the strut, and is engaged by a thermally conductive member which functions as a heat collector.

21 Claims, 6 Drawing Figures

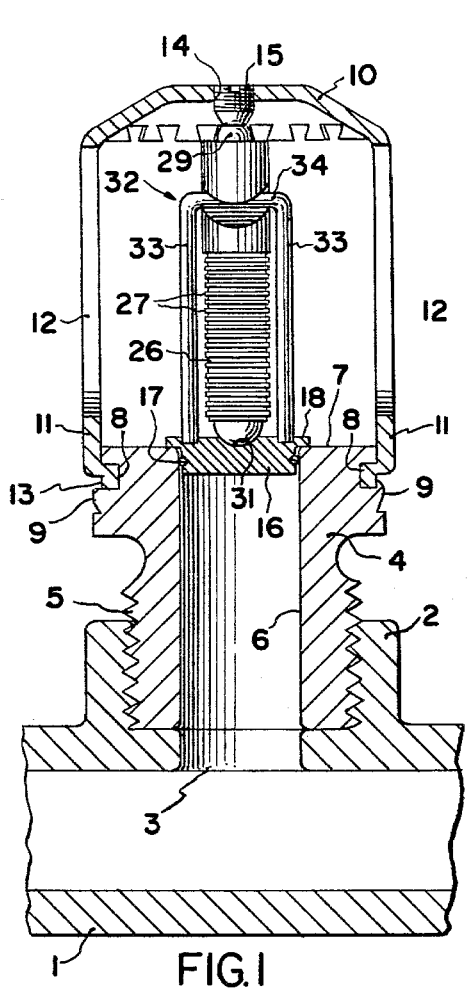

SPRINKLER HEAD CONSTRUCTION

BACKGROUND OF THE INVENTION

It is common to utilize sprinkler heads in buildings for the purpose of enabling water to be applied automatically to a fire in the building. Most sprinkleer heads incorporate a heat sensitive member formed of eutectic material which liquifies upon reaching a predetermined critical temperature. In most conventional sprinkler head constructions, the eutectic material forms part of a link or strut which normally precludes the discharge of water from the head, but which, upon reaching its predetermined temperature, liquifies and effects collapsing of the link or strut, thereby enabling a value to open and water to be sprayed from the head. Examples of such prior constructions are illustrated in U.S. Pat. Nos. 241,937; 1,315,079; 1,584,719; 2,129,012; and 2,664,956.

One of the difficulties with conventional sprinkler heads is the time required to raise the temperature of the eutectic material to that at which it liquifies. It is not uncommon for the temperature within a building to rise to a level corresponding to or above the critical temperature of the eutectic material and to remain at such elevated temperature for an unduly long period of time before the sprinkler is actuated. This is believed to be due, in large part, to the fact that, in such prior constructions, heat is absorbed not only by the eutectic material, but by all parts of the sprinkler head. Thus, although the ambient temperature is at or higher than the critical temperature, some time is required for the eutectic material to absorb sufficient heat to raise it to its critical temperature. In those instances in which heat must be transmitted via other parts of the sprinkler head to the eutectic material, therefore, the necessity of raising the temperature of such other parts to the critical temperature actually results in a time lag in sprinkler head operation. Such time lag in some cases may mean the difference between losing and saving the building and its contents.

SUMMARY OF THE INVENTION

A principal objective of the present invention is to provide an automatic sprinkler head construction in which the actuation of the sprinkler system depends upon the liquification of a heat sensitive, eutectic material and wherein the construction is such as to concentrate the heat to which the eutectic material is exposed. This objective is accomplished by sandwiching the eutectic material between a pair of thermally insulating members which, together with the eutectic material, constitute the actuating mechanism for the sprinkler head. In addition, a heat collector of highly thermally conductive material encircles the insulating members and engages the eutectic material. Inasmuch as the thermally insulating parts of the actuating mechanism do not drain heat from the collector, the heat collected by the collector will be concentrated at the zone at which it engages the eutectic material, thereby accelerating the transfer of heat from the collector to the eutectic material.

Another object of the invention is the provision of a sprinkler head which is more economical to produce than currently available sprinkler heads.

DESCRIPTION OF THE DRAWINGS

The foregoing and other advantages of the invention will be pointed out specifically or will become apparent from the following description when it is considered in conjunction with the accompanying drawings, in which:

FIG. 1 is a view partly in section and partly in elevation of a sprinkler head constructed in accordance with one preferred embodiment of the invention and coupled to a sprinkling system;

FIG. 2 is an enlarged, elevational view of the actuating mechanism shown in FIG. 1;

FIG. 3 is a sectional view taken on the line 3—3 of FIG. 2;

FIG. 4 is a plan view of a blank adapted to form a part of the sprinkler head;

FIG. 5 is a fragmentary view of a modified form of the invention; and

FIG. 6 is a plan view of a portion of the apparatus shown in FIG. 5.

DETAILED DESCRIPTION

Apparatus constructed in accordance with the invention is adapted for use in a sprinkler system having a plurality of water pipes, one of which is shown at 1 in FIG. 1 and which is provided at intervals with interiorly threaded fittings 2 each of which surrounds an outlet opening 3 in the pipe. Adapted for accommodation in the fitting 2 is a coupling 4 having a threaded end 5 for reception within the fitting 2 and having a passage 6 extending therethrogh in register with the opening 3. The opposite end of the coupling 4 has a flat face 7. Adjacent the face 7 the coupling is formed with a pair of opposed grooves 8 and corresponding ribs 9 for a purpose presently to be explained.

A sprinkler head constructed according to the invention includes a frame F formed from a metal shaped to form a generally circular deflector 10 from which extends a pair of mounting legs 11. Each leg preferably has an elongate opening 12 therein, and each leg terminates at its free end in an offset mounting foot of such size as snugly to be accommodated in the groove 8. After forming, the blank is shaped so that the deflector plate 10 has a concavo-convex configuration, as shown in FIG. 1, and the center of the plate is provided with a tapped opening 14 for the accommodation of an adjustable set screw 15. Alternatively, the plate 10 may have a spherical dimple in lieu of the set screw. The plate 10 is fitted to the coupling 4 by inserting the mounting feet 11 in the grooves 8, following which the ribs 9 are deformed to engage and interlock with the feet.

The passage 6 normally is sealed by a valve or plug 16 of such size as to be accommodated in the passage. An O-ring 17 carried by the valve 16 forms a seal. The valve 16 also includes a flange 18 which normally overlies and rests upon the face 7 of the fitting 4.

Although the valve 16 normally seals the passage 6, it is capable of being unseated by the pressure of water in the line 1 and in the passage 6. It is necessary, therefore, to provide means for holding the valve in its passage-sealing position until such time as the passage should be opened. Such holding means comprises a strut assembly 20 composed of a pair of members 21 and 22 arranged end-to-end but spaced by a gap G in which is sandwiched a wafer 23 formed of eutectic material. The members 21 and 22 are formed of thermally insulating material, such as Bakelite, epoxy, and the like, whereas the wafer 23 is formed of a eutectic material having excellent heat transfer properties, such as an alloy of bismuth, tin, and lead. The material from which the wafer is made has a predetermined critical temperature at which it liquifies. Typically, such wafers liquify at temperatures of between 135° F. and 500° F.

The member 21 has a reduced diameter shank 24 which forms a shoulder 25. Encircling the insulating member 22, the shank 24, and spanning the gap G is a heat collecting sleeve 26 formed of a material, such as brass, bronze, and the like that is highly heat conductive and resistant to corrosion. Preferably, the outer surface of the sleeve 26 is provided with fins 27 to increase the external surface area of the sleeve.

The diameter of the shank 24 corresponds substantially to the internal diameter of the sleeve, and the diameter of the wafer 23 also corresponds to the internal diameter of the sleeve so as to enable the wafer 23 to fit snugly within and in engagement with the sleeve. The diameter of the member 22, however, necessarily is less than the internal diameter of the sleeve, thereby ensuring free movement of the member 22 axially of the sleeve and providing an annular passageway or space 28 for a purpose to be explained presently.

When the parts of the strut are assembled, the insulating members 21 and 22 bear upon the wafer 23 and project beyond opposite ends of the sleeve 26. The outer end of the member 21 is provided with a rounded protrusion 29 that is adapted to be seated in a dimple (not shown) formed in the set screw 15 or in the plate 10. The outer end of the insulating member 22 has a rounded surface 30 that is adapted to be accommodated in a complementally shaped recess 31 formed in the upper surface of the valve 16. In assembled relation, the strut 20 spans the distance between the set screw 15 and the valve 16 and forcibly maintains the latter in sealing relation within the passage 6.

The apparatus preferably includes ejecting means 32 for accelerating removal of the strut 20 from between the fittings 4 and the deflector 10. The ejector comprises a U-shaped spring having parallel legs 33 joined at one end by a bight 34 which is adapted to be accommodated in a slot 35 formed in the member 21. The free ends of the legs 33 are accommodated in sockets 36 formed in the upper surface of the valve 16. The legs 33 are prestressed in such manner that they constantly exert a force on the strut 20 tending to move the lower end of the latter to the left, as viewed in FIG. 3, but such biasing force normally is overcome by the accommodation of the rounded ends 29 and 30 of the members 21 and 22 in their associated dimples.

The embodiment illustrated in FIGS. 5 and 6 differs from the earlier described embodiment in two ways. First, the ejector 32 is not required, although it may be used if desired. Second, the valve 16 is replaced by a valve 37 having a retainer 38 formed of soft metal, such as copper, or bronze, and within which is retained a disc 39 of harder metal. The disc has a dimple 40 in one surface thereof for the accommodation of the strut member 22. The retainer 38 also includes a laterally projecting tongue 41 having a lip 42 at its free end. In this embodiment, the coupling 4 has an upstanding valve seat 43 surrounding the passage 6 and on which the valve 37 seats.

When the parts of the apparatus are assembled in the manner as shown in FIGS. 1–3, the valve 16 will be maintained firmly in its passage-sealing relation by means of the strut 20, and the entire assembly will be exposed to ambient temperature. Should the temperature rise, as would be the case in the event of a fire, the thermally conductive sleeve 26 will absorb heat. Since the members 21 and 22 are formed of thermally insulating material, there will be little heat transfer to such members from the sleeve. The eutectic wafer 23, however, is highly heat conductive. Accordingly, heat from the sleeve 26 rapidly will be transmitted to the wafer 23 to raise its temperature. When the temperature of the wafer 23 reaches a predetermined, critical temperature, such as 165° F., the eutectic material will liquify and flow out the gap G into the annular passageway 28, thereby making possible movement of the member 22 toward the member 21. When the member 22 has moved toward member 21 a sufficient distance, the force of the ejector 32 will cause the nose 30 of the member 22 to slide out of the dimple 31 and displace the entire strut assembly from between the legs 11 with a snap action, thereby enabling water to issue from the passage 6 amd impinge upon the deflector 10.

The operation of the embodiment shown in FIGS. 5 and 6 corresponds to that of the earlier described embodiment with the exception that displacement of the member 22 toward the member 21 enables water to flow out of the passage 6 more quickly. Water issuing from the passage 6 will impinge upon the tongue 41 and upon the lip 42, thereby creating an unbalanced condition which ensures rapid removal of the valve 37 from the path of water issuing from the passage 6.

In each of the disclosed embodiments it is possible to accelerate, to a certain extent, the transfer of heat from the collecting sleeve 26 to the eutectic wafer 23. This may be accomplished by interposing between the wafer and the member 21 a thin disc 44 of material having excellent heat conductive properties, such as copper. The periphery of the disc 44 should be in engagement with the inner surface of the sleeve 26 and, if desired, the disc may have a peripheral flange 45 to increase the surface engagement. If the disc is used, it conducts heat inwardly from the sleeve 26 and transfers such heat to the surface of the wafer, thereby accelerating raising of the temperature of the wafer inwardly of the sleeve 26.

Although it is preferred to provide space for flow of the liquified eutectic material by the simple expedient of forming the member 22 to a diameter less then that of the sleeve 26, it is possible to achieve the same result in other ways. For example, the member 22 could be configured so that it tapers toward its free end, or its free end could be provided with a recess, or the sleeve 26 could be apertured adjacent the gap G.

The disclosed embodiments are representative of presently preferred forms of the invention, but are intended to be illustrative rather than definitive thereof. The invention is defind in the claims.

I claim:

1. In a sprinkler head construction having a coupling adapted to be mounted on a fluid line and having a passage therein through which fluid may flow, a removable closure member normally sealing said passage, a frame carried by said coupling and having a portion overlying said closure member, and a strut assembly interposed between said frame portion and said closure member and normally maintaining the latter in sealing relation with said passage, the improvement wherein said strut assembly comprises a eutectic member sandwiched between a pair of elongate, thermal insulators extending in longitudinal prolongation of one another, said eutectic member and said insulators being encircled by a thermally conductive member.

2. A construction according to claim 1 wherein said thermally coductive member and said eutectic member are in engagement.

3. A construction according to claim 1 wherein said thermally conductive member is finned to increase its surface area.

4. A construction according to claim 1 including a second thermally conductive member interposed between said eutectic member and at least one of said insulators.

5. A construction according to claim 4 wherein said second conductive member is in engagement with the first-mentioned conductive member.

6. A construction according to claim 1 including spring means acting on said strut assembly and biasing the latter to move from between said frame portion and said closure member.

7. A construction according to claim 6 including means reacting between said strut assembly, said closure member, and said frame portion and normally overcoming the bias of said spring means.

8. A construction according to claim 1 wherein the relative sizes of said conductive member and at least one of said insulators are such as to provide clearance therebetween.

9. A construction according to claim 1 wherein said closure member comprises a plug removably fitted into said passage.

10. A construction according to claim 1 wherein said closure member comprises a plate overlying said passage.

11. A construction according to claim 10 wherein said plate has a tongue extending from one side thereof.

12. A construction according to claim 1 wherein said frame portion comprises a substantially circular plate.

13. A construction according to claim 1 wherein said frame includes a pair of spaced apart legs extending from said frame portion in a direction toward said coupling, each of said legs terminating in a mounting foot offset from said leg and extending toward the other of said legs.

14. A construction according to claim 13 wherein each mounting foot is accomodated in a recess formed in said coupling.

15. A strut construction for use in a sprinkler head comprising a pair of elongate members formed of thermally insulating material extending in axial prolongation of one another and spaced apart by a gap; a fusible member formed of eutectic material occupying said gap; and a sleeve of thermally conductive material encircling said pair of elongate members and spanning said gap.

16. A construction according to claim 15 wherein one end of each of said pair of elongate members protrudes beyond said sleeve.

17. A construction according to claim 16 wherein the protruding end of each of said pair of elongate members is rounded.

18. A construction according to claim 15 including a thermally conductive member accommodated in said sleeve and interposed between one of said pair of elongate members and said eutectic member and being in engagement with the latter.

19. A construction according to claim 18 wherein said thermally conductive member is in engagement with said sleeve.

20. A construction according to claim 15 wherein said eutectic member liquifies at a predetermined temperature, and wherein a selected one of said pair of elongated members and said conductive member is configured to permit liquified eutectic material to flow out of said gap.

21. A construction according to claim 15 wherein said sleeve has an irregular outer surface to increase the area thereof.

* * * * *

UNITED STATES PATENT AND TRADEMARK OFFICE
CERTIFICATE OF CORRECTION

PATENT NO. : 4,343,364
DATED : August 10, 1982
INVENTOR(S) : Hermann R. Glinecke It is certified that error appears in the above-identified patent and that said Letters Patent are hereby corrected as shown below:

Column 1, line 7, change "sprinkleer" to --sprinkler--

Column 1, line 15, change "value" to --valve--

Column 1, line 18, change "214,937" to --241,973--

Column 2, line 28, change "therethrogh" to --therethrough--

Column 2, line 34, before "metal" insert --blank of--

Column 3, line 37, change "fittings" to --fitting--

Column 5, line 2, change "coductive" to --conductive--

Column 6, line 32, change "elongated" to --elongate--

Signed and Sealed this

Twenth-eighth Day of September 1982

[SEAL]

Attest:

GERALD J. MOSSINGHOFF

Attesting Officer     Commissioner of Patents and Trademarks